United States Patent [19]

Wittenbrook et al.

[11] 4,082,533
[45] Apr. 4, 1978

[54] COATED CONTROLLED-RELEASE PRODUCT

[75] Inventors: Lawrence S. Wittenbrook, Marysville; Edwin L. Scheiderer, Columbus, both of Ohio

[73] Assignee: D. M. Scott & Sons Company, Marysville, Ohio

[21] Appl. No.: 373,972

[22] Filed: Jun. 27, 1973

[51] Int. Cl.² .................................................. C05C 9/00
[52] U.S. Cl. ........................................ 71/28; 71/64 E; 71/64 F
[58] Field of Search .................... 71/28, 64 E, 64 F

[56] References Cited
U.S. PATENT DOCUMENTS

Re. 27,238  11/1971  Stansbury .................. 71/64 F X
2,806,773   9/1957   Pole ............................. 71/64 E
3,192,031   6/1965   Zaayenga ..................... 71/64 F
3,372,019   3/1968   Fox .............................. 71/64 F Primary Examiner—Charles N. Hart
Assistant Examiner—Ferris H. Lander
Attorney, Agent, or Firm—J. B. Raden; H. J. Holt

[57] ABSTRACT

A coated product providing for the controlled release of an active constituent, such as a fertilizer, over a long period of time comprising a core of an active constituent and two water insoluble coatings. The first coating surrounding the core contains masonry cement, and the second coating preferably contains a blend of one or more thermoplastic polymers and a wax. The coated product provides an unusually long lasting fertilizer at relatively low cost.

21 Claims, 2 Drawing Figures

COATED CONTROLLED-RELEASE PRODUCT

BACKGROUND OF THE INVENTION

This invention relates to a controlled-release product and to a process for its preparation and in particular, to a controlled-release fertilizer.

Nitrogen, phosphorus and potassium are the primary essential elements for plant growth, and commercially available fertilizers invariably comprise either or both an organic and an inorganic compound containing one or more of these elements in some form. Agronomically, most commercially available fertilizer materials are marked by one notably detrimental physical property — high water solubility. Thus, treatment of plants with highly water soluble fertilizer materials, particularly nitrogen-containing, can be undesirable when used as such because the nutrient is readily solubilized in the soil solution resulting in luxury consumption and nutrient imbalances. If the release of nutrients were controlled to more closely match actual plant requirements, a number of advantages would accrue. Evaluated from the viewpoint of plant physiology, controlled-release fertilizers, as compared to many conventional fertilizers, maintain a more optimum concentration of nutrient in the root zone over a larger part of the plant growth period. Particularly in the case of turfgrass, controlled-release fertilizers applied in a single application provide a more even rate of growth than split applications of a soluble fertilizer at comparable rates over a growing season. Other advantages of controlled-release fertilizers are minimization of nutrient losses by runoff or volatilization, reduction of application costs through reduction in frequency of applications and prevention of vegetation burning or damage to seedlings.

Many attempts to control nutrient release to plants have been made with varying degrees of success. These efforts have focused on two broad areas: (1) development of polymeric or discrete chemical compounds that have limited water solubility, and (2) altering soluble compounds in some manner to retard their release in the soil solution, as by coatings or matrices which are water-insoluble. A number of patents have issued on the results of these efforts, many of which are directed to coatings for fertilizers. Such coatings have included single or multiple layers of natural occuring and synthetic polymers, waxes, inorganics including sulfur, diatomaceous earth, clays, glass asbestos, calcium carbonates and various combinations of the foregoing.

However, coatings must satisfy a demanding list of requirements. Coating materials should ideally be water soluble, inexpensive, easy to apply and not subject to blocking, melting, cracking or decomposition under a fairly wide range of environmental conditions encountered in storage and handling. In addition, coating materials should be substantially unreactive and effective at relatively low percentages by weight of the fnal product — preferably 25% or less — in order to provide the greatest fertilizer benefit and the lowest coating cost per unit weight of product. Known coatings are deficient in one or more of these requirements.

SUMMARY OF THE INVENTION

It is a primary object of this invention to provide a controlled-release product which combines low cost with an unusually slow rate of release.

It is a more specific object of this invention to provide a coated product which is particularly effective for the controlled-release of nutrients to a broad variety of vegetation.

It is still an additional object of this invention to provide a relatively simple and economical process for the preparation of a controlled-release product.

The foregoing and other objects of the invention are achieved in a controlled-release product comprising a core containing an active constituent, and two water insoluble coatings surrounding the core, the inner of said coatings comprising cement and the second coating, in its preferred form, comprising a blend of polymeric material and a wax. In a particularly preferred embodiment of the invention, the active constituent is a fertilizer, the first coating is masonry cement and the second coating is a blend of wax and two thermoplastic polymers.

The products of the invention are prepared by coating a core comprising a water-soluble active constituent with a finely divided mixture containing cement and applying to the coated core a second water insoluble coating. The cement coating may be applied to the dry core by a simple dusting-on process or by first heating the core to melt its surface or by wetting the core with water. The second coating may be applied by tumbling the cement coated core and slowly adding the wax blend or other coating while both core and polymer are heated.

BRIEF DESCRIPTION OF THE DRAWING

The invention will be better understood in connection with the accompanying drawing in which.

DETAILED DESCRIPTION

Figure 1:
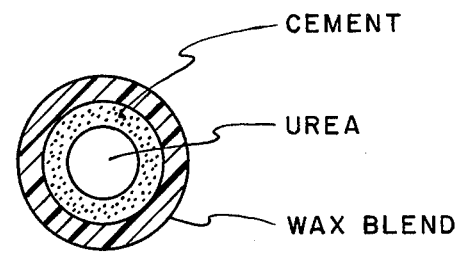
FIG. 1 shows in greatly enlarged cross-section one embodiment of the controlled-release product of the invention.

While the invention is useful for the controlled release of a variety of active constituents, it is primarily useful for the controlled release of fertilizers and will accordingly be specifically described in connection with a water soluble fertilizer substrate. However, the invention is also applicable to the coating of other water soluble active constituents where prolonged or controlled release is desirable, including pesticides, herbicides, fungicides, growth regulators, insecticides and animal and insect repellents. Such active constituents are well known and examples are set forth in the literature. It is preferable that the active constituent be in solid, particulate form and it should not decompose or melt at processing temperature. In addition, the active constitutent will normally be highly water soluble, as the principle object of the present invention is to control leaching of the active constituent with water.

The first coat, variously referred to herein as the primer or inner coat, contains cement. The term "cement" is used herein to identify a powder of alumina, silica, lime, iron oxide and magnesia burned together in a kiln and finely pulverized, normally used as an ingredient of mortar and concrete. The product from the burning process is often referred to as "clinker." The most effective cement for the purpose of this invention is that commonly referred to as "masonry cement" by the Cement industry. Masonry cement comprises a mixture of varying amounts of clinker, limestone (calcium carbonate), gypsum (calcium sulfate), calcium stearate and a wood rosin. The addition of a small amount (about 1 – 10% based on the weight of cement) of bentonite has also been found to be beneficial. The amount of masonry cement used for best results ranges from 3 – 12% by weight of the final product with 5 – 10% an optimum amount.

The primer coat may be applied to the fertilizer by a number of methods. The coating may be dusted on by intermittently mixing the cement with the fertilizer granules in a rolling drum or similar device until the cement is distributed over all the particles. This method is effective for cement coatings in the 3 – 4% by weight range. The amount of coating can be increased to include the otpimum weight ranges of coating (normally 5 – 8%) by wetting the fertilizer granules with a fine mist of water — about 1% or less by weight of fnal product — before and during dusting on the cement. The water serves to enhance the adherence of the cement particles to the fertilizer and to each other.

Alternatively, the full range of primer coating percentages can be applied by preheating the fertilizer. For example, a rolling bed of the fertilizer is heated to near the melting point (115° – 120° C in the case of urea) to liquify the surface of the granules and the cement is then dusted on. The cement particles readily adhere to the outermost surface of the fertilizer particles because of a thin film of liquid present. This method is useful with urea or other low melting active constituents.

The cement coated granular fertilizer is then coated with a second coating or topcoat of a polymer, preferably a blend of two polymers and a wax. The amount of topcoat used will depend on the specific composition selected and the desired duration of prolonged release. Generally this amount will range from 5 – 25% of the total weight of the final controlled release product.

A particularly suitable topcoat composition is a blend of (1) a wax, (2) an interpolymer of an unsaturated ester and an olefin and (3) a thermoplastic hydrocarbon resin. The wax may be a natural wax, a petroleum wax such as paraffin wax or a microcrystalline wax. The wax may also contain small percentages of an antioxidant to prevent oxidation at higher temperatures. The interpolymer may be a copolymer of ethylene, propylene, butylene or other lower alkyl olefin and vinyl acetate or ethyl acrylate. The interpolymer may also be a terpolymer of ethylene, vinyl acetate and an organic acid. The preferred interpolymer is a copolymer of ethylene and vinyl acetate such as that sold under the trademark Co-MER EVA-506 by Union Carbide Corporation. The latter is a medium molecular weight copolymer containing 28% vinyl acetate and having a melt index of 12 gm./10 min., a softening point of 225° F, an inherent viscosity at 30° C of 0.87 (0.25% in toluene) and a density of 0.952 gm./cc.

Coatings of a blend of a wax and an unsaturated ester-olefin copolymer have a tendency to crack and crumble at low copolymer concentrations, while at higher concentrations, the blends are too viscous to permit their practical use in commerical coating operations. The incorporation of a modifying thermoplastic resin in the wax-copolymer blend provides a very tough, yet flexible coating material that is easy to apply even though composed mainly of wax. A number of thermoplastic resins are useful for this purpose including hydrocarbon polymers such as the polyolefins, polymers and copolymers of vinyl chloride, vinylidene, chloride, vinyl esters, styrene, acrylate and methacrylate esters and other thermoplastic resins which will readily occur to those skilled in the art. A particularly suitable thermoplastic resin is Nevex 100 a hydrocarbon resin sold by Neville Chemical Company having the following properties: Specific gravity at 25/15.6° C – 1.12°; Softening Point, R & B - 99° C: Gardner Viscosity at 25° C (70% in Toluene, Bubble-Seconds) - 2.65 (J-K); Gardner Viscosity at 25° C (70% in Mineral Spirits, Bubble-Seconds) - 22.0 (Z); Acid Number - Nil; Ash, Wt.% - Trace; Refractive Index at 25° C – 1.620.

The topcoat should be used in approximate ratios of 20 – 35% interpolymer, 5 – 15% thermoplastic resin and 50 – 75% wax. However, these ratios will of course vary depending upon the specific choice of components. The proportion of topcoat to total weight of the final product will normally range from about 5 – 25%. This proportion will also vary depending upon the desired duration of release of the fertilizer or other active constituent of the final product.

The topcoat may be applied by a number of methods. For example, the cement-coated fertilizer may be heated to about 70° – 100° C and while tumbled, a premixed and heated (100° – 150° C) wax-polymer topcoat is slowly poured onto the cement-coated fertilizer. The product is then permitted to cool. A flow conditioner may be added during tumbling to promote bed circulation, and during cooling, to promote particle segregation.

It may optionally be desirable to apply a thin coating of a microcrystalline wax, for example from 1 – 7% of the weight of the final product, to the topcoat to further enhance the controlled-release properties of the final product. It has also been found that the properties of the final product are enhanced when the coated product is reheated to a temperature near the melting point of the coating to anneal the topcoat. This improvement is believed to result from the closing off of cracks and imperfections in the coating created during the cooling step.

One embodiment of the final product of the invention is illustrated in cross-section in FIG. 1 in the drawing. The core is shown as urea fertilizer particles, the primer coat as cement and the topcoat as a wax blend.

The effectiveness of the present product is based to a considerable extent on the unique attributes of cement. The wax-polymer or other water insoluble outer layer protects the internal phase from liquid water, but is a relatively ineffective barrier against water vapor. The cement layer has the ability to trap incoming water vapor in its crystal lattice by means of a hydration reaction and in the process hardens to form a second water barrier. This is a characteristic found in essentially no other finely divided solid. The cement layer also serves to fill cracks and imperfections in the urea granules affording a more uniform coating surface for application of the wax-polymer blend. The net result is a two layer coating combining to produce a highly effective controlled release product.

The following examples illustrate the practice of the invention. All parts are by weight unless otherwise indicated.

EXAMPLE 1

Prilled urea, 300 grams of U.S. Standard 6 – 14 mesh size, was added to a stainless steel rolling drum apparatus mounted at about a 18° angle and rotated at about 40 rpm. Masonry cement, 20 grams, was dusted onto the rotating urea bed by alternating addition of cement and a fine water mist until all of the cement was firmly attached to the urea particles.

A wax-polymer coating media was prepared by first melting 62.5 grams of paraffin wax and 0.5 grams of a butylatedhydroxy toluene as an antioxidant. To this hot melt, about 125° C, was slowly added 10 grams of Nevex 100 thermoplastic resin followed by 27 grams of an ethylene-vinyl acetate copolymer (EVA-506). Heating and stirring was continued until a homogeneous wax-polymer blend was obtained.

Cement-coated urea, was obtained above, 320 grams, was heated to 80° – 85° C in the rolling drum apparatus (rotating at about 40 rpm) by means of a heat gun directed on the exterior of the drum. To the heated urea bed was added portionwise 35 grams of the above prepared wax-polymer blend previously heated to 125° C. A flow conditioner, about 1 gram of Aerosil R-972, was distributed on the particles during the blend addition to promote bed rotation and prevent particle agglomeration. (Aerosil R-972 is a highly dispersed fumed silica consisting of 99.8% $SiO_2$ + (—$CH_3$) and having an average particle size of approximately $20 \times 10^{-7}$ cm.) When all the blend was added, heat was removed and the product allowed to cool to ambient temperature. After solidification, the product was removed for testing.

Several additional samples of coated products were prepared in accordance with Example 1 but substituting, in place of cement, a number of primer coats disclosed in the literature. In all cases the fertilizer substrate and topcoat were those used in Example 1. The other primer coatings used were as follows:

Talc — Finely divided talc was applied to the prilled urea by intermittently dusting on the talc and spraying a fine mist of water. 5.6% of talc was used — based on the weight of the final coated product. 10.7% of the topcoat was applied to the talc-coated urea.

Diatomaceous Earth — 5.5% of this powder was applied to prilled urea with water. This was coated with 11.3% of the topcoat.

Sulfur powder — 3.8% powder was applied by dusting on dry urea followed by 12.4% of topcoat.

Lampblack — 2.9% lampblack was applied by dusting on dry urea followed by a 12.4% topcoat.

Limestone — Limestone is a significant constituent in masonry cement and accordingly was tested to compare its leach rate with products of the invention. Thus urea was coated with 5.5% of finely divided limestone followed by 10.5% of the topcoat.

Plaster-of-Paris — A 5.6% coating of this powder was applied by water vapor followed by a 10.6% topcoat.

The leach rate of coated urea fertilizer materials was determined by immersing the material in water for specified periods of time and then analyzing the water for the amount of urea present. Ambient room temperature (approx. 23° C) distilled water was used. The Urease Method for urea, the method used, is essentially that found on page 19 of "Official Methods of Analysis of the Association of Official Analytical Chemists," Eleventh edition, 1970.

Specifically, 75 ml of water were added to 5 grams of sample in a 100 ml beaker. The beaker was covered with a watch glass and allowed to stand the desired length of time. 2 ml aliquots were taken after 1 hour, 24 hours and at weekly intervals. The samples were stirred with a pipet prior to removing the aliquot as the leached urea concentrated in the bottom layer of the beaker. Aliquots were placed in a 125 ml Erlenmeyer flasks, 10 ml of 0.5% Jack Bean Urease were added, and allowed to stand for 1 hour. Samples were then titrated with 0.5N HCl to the color change of mixed indicator (methyl red-0.5g and methylene blue-0.081g in 250 ml alcohol). The percent leach was calculated from milliliters of standard acid required for titration.

Figure 2:
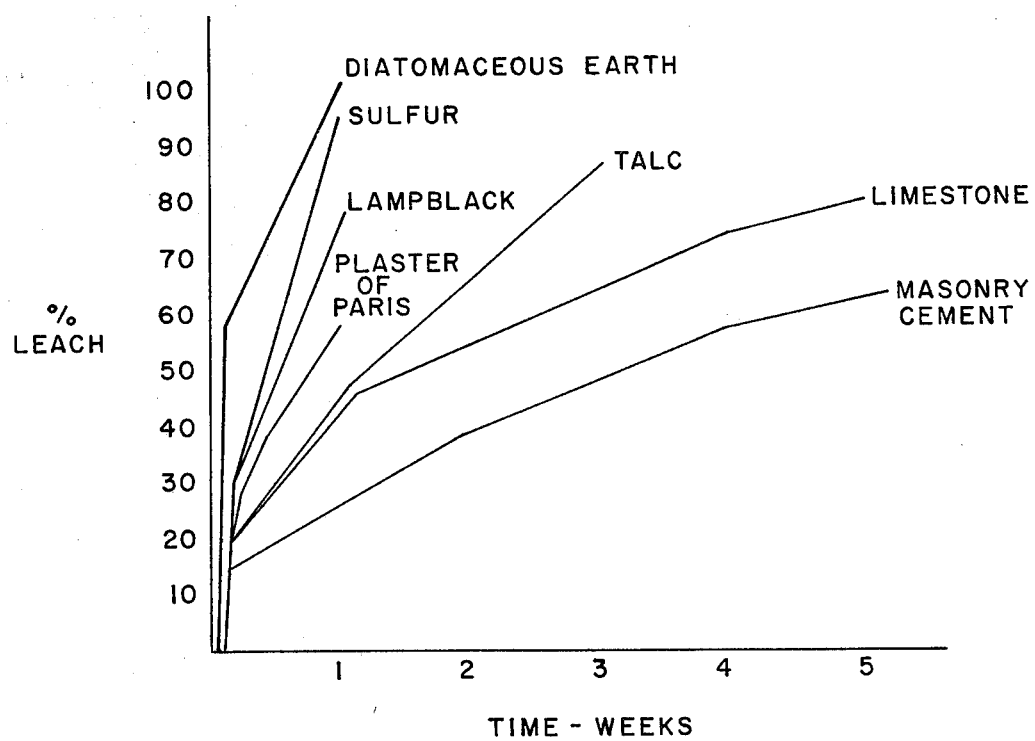
FIG. 2 is a graph comparing the effectiveness of a number of coated products with that of the invention, the products differing only in the substitution of the indicated inner or primer coats.

The results of these tests are set forth in the graph of FIG. 2 of the drawing. It will be seen that the longest duration of release of all coating was that of Example 1 containing a primer coating of masonry cement.

EXAMPLE 2

A coated product was prepared as in Example 1 except that 40 grams of masonry cement and 36 grams of the wax-polymer blend were used to make up the final product.

A series of greenhouse tests were run on the coated products of Examples 1 and 2. The tests were run on plots of Windsor Kentucky bluegrass seedlings containing adequate levels of phosphorous and potassium. The tests were conducted on all plots at the same time to eliminate variables such as light intensity, air temperatures and the like from affecting the results. Ingredients in parts by weight per hundred of the two experimental products were as follows:

|  | Example 1 | Example 2 |
|---|---|---|
| Urea | 84.5 | 79.8 |
| Cement precoat | 5.6 | 10.6 |
| Wax Blend topcoat* | 9.9 | 9.6 |

*62.5% Paraffin Wax; 10% Nevex 100; 27% EVA-506; 0.5% BHT Antioxident.

In addition, for comparison, a grass plot was also treated with uncoated urea and a further control plot was untreated.

Table I shows the results of the foregoing tests one week after treatment in terms of initial injury. These test results are a good indication of what happens when an excessive amount of nutrient is available to plant in a very short period of time with a highly water soluble fertilizer such as urea.

TABLE I

% Initial Injury
(Observations taken one week after treatment.)

| Sample | % Total Nitrogen in Sample | Lbs. Nitrogen/ 1,000 sq.ft. Applied to Plot | % Injury |
|---|---|---|---|
| Example 1 | 37 | 2.7 | 0 |
| Example 2 | 35 | 2.7 | 0 |
| Urea-uncoated | 46 | 2.7 | 6.5 |
| Control | — | — | 0 |

Observations were made of the color of the above plots at periodic intervals after treatment. The results are set forth in Table II.

TABLE II

| Sample | Lbs. Nitrogen/ 1000 sq.ft. Applied to Plot | Turf Color Days after Treatment | | | | | | | | | | |
|---|---|---|---|---|---|---|---|---|---|---|---|---|
| | | 22 | 29 | 38 | 48 | 56 | 65 | 76 | 86 | 97 | 111 | 136 |
| Example 1 | 2.7 | 8 | 8.5 | 8.5 | 9 | 10 | 9.5 | 10 | 10 | 9.5 | 7.5 | 5.5 |
| Example 2 | 2.7 | 9 | 9 | 9 | 9.5 | 10 | 8.5 | 9.5 | 10 | 10 | 9.5 | 7.5 |
| Urea-Uncoated | 2.7 | 8.5 | 9 | 9 | 8 | 7.5 | 7 | 6.5 | 5.5 | 5.5 | 3.5 | 3.5 |
| Control | — | 9 | 8 | 9 | 8 | 7.5 | 7 | 7 | 4.5 | 5.5 | 3 | 3 |

The numbers showing color are based on the following scale:

7 - 10 Excellent Color (deep green)
5 - 7 Good Color
3 - 5 Fair Color
0 - 3 Poor Color It is evident from Table II that the coated product had either good or excellent color after almost 5 months even though the coating weight was 20% or less of the total product weight.

Table III contains fresh weight data at the various time intervals. This is simply the weight of grass clippings on the indicated day. Clipping weights are a conventional indicator of nutrient uptake by a test plant, and therefore of fertilizer release characteristics.

TABLE III

| Sample | Lbs. Nitrogen/ 1,000 sq.ft. Applied to Plot | Fresh Weight, grams Day | | | | | | | | | | |
|---|---|---|---|---|---|---|---|---|---|---|---|---|
| | | 10 | 22 | 29 | 38 | 48 | 56 | 65 | 76 | 86 | 96 | 111 | 136 |
| Example 1 | 2.7 | .71 | .59 | .65 | .84 | 1.18 | 1.17 | .99 | 1.35 | 1.16 | .64 | .30 | .13 |
| Example 2 | 2.7 | .68 | .59 | .64 | .76 | .78 | .89 | .70 | .91 | 1.06 | .95 | .75 | .38 |
| Urea-Untreated | 2.7 | .37 | .58 | .59 | .88 | .78 | .65 | .36 | .33 | .18 | .13 | .02 | .01 |
| Control | — | .59 | .60 | .79 | .78 | .48 | .28 | .19 | .17 | .09 | .05 | .01 | .01 |

EXAMPLE 3

A third coated product was prepared as set forth in Example 1 except that one gram of bentonite was blended with 19 grams of masonry cement to provide the precoat. All other ingredients of the product remained the same. Water leach test, described above in connection with Example 1, indicated substantially longer retention of nitrogen than the coated products of Examples 1 and 2 — approximately 10 weeks versus 5 to 6 weeks. While this magnitude of improvement may not necessarily be duplicated in a soil environment, the test results do indicate that the inclusion of a small proportion of bentonite in the precoat prolongs the release of active fertilizer ingredient.

Virtually any fertilizer or plant nutrient may be used in the practice of the invention including, by way of example, urea, ammonium nitrate, ammonium sulfate, potassium chloride, potassium sulfate and monoammonium phosphate. In addition a combination of active ingredients may be used, as for example, more than one fertilizer or a fertilizer and a pesticide or other non-fertilizer ingredient.

The foregoing is a description of illustrative embodiments of the invention, and it is applicant's intention in the appended claims to cover all forms which fall within the scope of the invention.

We claim:

1. A coated product providing for the release of a water soluble fertilizer over a long period of time comprising a core containing a water soluble fertilizer in particulate form and two water insoluble coatings surrounding said core, the inner of said two coatings comprising cement.

2. The coated product of claim 1 in which the second coating is a wax-polymer blend.

3. The product of claim 2 in which the second coating is a blend of at least one thermoplastic resin and a wax.

4. The product of claim 3 in which the second coating is a blend of a thermoplastic interpolymer, a thermoplastic hydrocarbon resin and a wax.

5. The product of claim 4 in which the copolymer is an ethylene-vinyl acetate copolymer.

6. The product of claim 4 in which the second coating contains by weight 20 - 35% interpolymer, 5 - 15% hydrocarbon resin and 50 - 75% wax.

7. The product of claim 2 in which the second coating is a blend of an ethylene-vinyl acetate copolymer, a thermoplastic hydrocarbon resin and a predominate amount of a paraffin wax.

8. The product of claim 1 in which the fertilizer is urea.

9. The product of claim 1 in which the first coating is masonry cement.

10. The product of claim 9 in which the first coating also contains bentonite.

11. The product of claim 1 in which the first coating is 3 - 12% of the total weight of the product.

12. The product of claim 1 in which the second coating is from 5 - 25% of the total weight of the product.

13. A controlled-release fertilizer product comprising a core containing a water-soluble fertilizer in particulate form, a first coating surrounding said core containing masonry cement, a second coating surrounding said first coating comprising a blend of a copolymer of an olefin and an unsaturated ester, a thermoplastic hydrocarbon resin and a wax.

14. The product of claim 13 in which the first coating contains masonry cement and bentonite and the second coating is a blend of a copolymer of ethylene and vinyl acetate, a thermoplastic hydrocarbon resin and paraffin wax.

15. A process for the preparation of a controlled-release product comprising coating a core comprising a water soluble fertilizer in particulate form with a finely divided mixture containing cement and applying to said coated core a second coating of a water insoluble material.

16. The process of claim 15 in which the second coating is a wax-polymer blend.

17. The process of claim 15 in which the first coating is applied as a powder by dusting on to the core.

18. The process of claim 15 in which the core is wetted with water before application of the first coating.

19. The process of claim 15 in which the core is heated to melt its outer surface before application of the first coating.

20. The process of claim 15 in which the core and first coat are heated before application of the second coating.

21. A coated product providing for the release of a water-soluble fertilizer over a long period of time comprising a core containing a water soluble fertilizer in particulate form and two water insoluble coatings surrounding said core, the inner of said two coatings comprising cement and bentonite, the second coating comprising a blend of a thermoplastic interpolymer, a thermoplastic hydrocarbon resin and a wax.

* * * * *